United States Patent
Ho

[11] Patent Number: 6,027,343
[45] Date of Patent: Feb. 22, 2000

[54] TOUCH CONTROLLED MULTIPLE FUNCTIONAL TERRESTRIAL GLOBE

[76] Inventor: Ping-Huang Ho, 122-5, Juan Liao Rd., Feng Yuan, Taichung Hsien, Taiwan

[21] Appl. No.: 09/285,086

[22] Filed: Apr. 2, 1999

[51] Int. Cl.[7] .................................................. G09B 27/08
[52] U.S. Cl. ...................... 434/131; 434/130; 434/136; 434/143; 434/145; 434/147; 362/809
[58] Field of Search ...................................... 434/130, 131, 434/136, 143, 145, 147; 362/806, 808, 809

[56] References Cited

U.S. PATENT DOCUMENTS

| | | | |
|---|---|---|---|
| 5,545,041 | 8/1996 | Tsuzuki | 434/136 |
| 5,660,463 | 8/1997 | Ho | 362/280 |

OTHER PUBLICATIONS

Rand McNally Globes. pp. 1–3. Rand McNally & Company. (434/131) Mar. 1970.

*Primary Examiner*—Robert A. Hafer
*Assistant Examiner*—Bena B. Miller

[57] ABSTRACT

A touch controlled multiple functional terrestrial globe is disclosed. A ball is a transparent round ball with a hollow inner space, a world map is depicted on the surface of the ball; a palm shape supporting frame for supporting the ball by the part between the thumb and the index finger. The under-pan of a ball driven device is firmly secured to an axial rod through a positioning piece for bearing the ball, a belt disk is installed on the lower portion thereof, while the belt disk is connected to another belt disk under the central shaft of the motor through a belt, therefore, by starting a decelerated motor, the ball is driven to rotate. A light source is mounted on the top of an axial rod and can emit light. A seat is installed on the lower portion of the palm shape supporting frame, a touch controlled sensing circuit system is installed therewithin, it can connected to the decelerated motor and the bulb base through a dual loop touch controlled switch circuit. When a finger touches the seat, the circuit will be conducted, then a multiple stage control of the light source and the power switching of the decelerated motor are performed simultaneously or sequentially, so that the motion of the ball and the illumination of the bulb may be presented simultaneously or sequentially.

2 Claims, 5 Drawing Sheets

TOUCH CONTROLLED MULTIPLE FUNCTIONAL TERRESTRIAL GLOBE

FIELD OF THE INVENTION

The present invention relates to a touch controlled multiple functional terrestrial globe, and especially to a terrestrial globe which is controlled by a touch controlled switch so that the motion of the ball and the illumination of the bulb may be presented simultaneously or sequentially.

BACKGROUND OF THE INVENTION

A terrestrial globe is a tool for teaching, which is a miniature of a real globe. The maps of nations all over the world is depicted on the terrestrial globe so that people can know the geometry therefrom. However, general terrestrial globes are static without any variation. Thus, there is an eager demand for a varied terrestrial globe. Thereby, it can present many vivid variations so that the viewer will feel interesting and the teaching effect is greatly improved.

SUMMARY OF THE INVENTION

Accordingly, the primary object of the present invention is to provide a touch controlled multiple functional terrestrial globe comprises a ball being a transparent round ball with a hollow inner space, a world map being depicted on the surface of the ball; a palm shape supporting frame for supporting the ball by the part between the thumb and the index finger; a ball driving device the under-pan of which is firmly secured to an axial rod through a positioning piece for bearing the ball, a belt disk is installed on the lower portion thereof, while the belt disk is connected to another belt disk under the central shaft of the motor through a belt, therefore, by starting a decelerated motor, the ball is driven to rotate; a light source being mounted on the top of an axial rod and can emit light; a seat installed on the lower portion of the palm shape supporting frame, a touch controlled sensing circuit system is installed therewithin, it can connected to the decelerated motor and the bulb base through a dual loop touch controlled switch circuit. When a finger touches the seat, the circuit will be conducted, then a multiple stage control of the light source and the power switching of the decelerated motor are performed sequentially, so that the motion of the ball and the illumination of the bulb may be presented simultaneously or sequentially.

The various objects and advantages of the present invention will be more readily understood from the following detailed description when read in conjunction with the appended drawing.

DETAILED DESCRIPTION OF THE PREFERRED EMBODIMENTS

Figure 1:
FIG. 1 is a perspective view of the present invention.

As shown in figures, the touch controlled multiple functional terrestrial globe of a present invention primarily comprises a ball (1), a palm-shape supporting frame (2), a ball driving device (3), a light source (4), and a seat (5).

A ball (1) is a transparent round ball with a hollow inner space, a world map is depicted on the surface of the ball (1). Pivotally holes are formed on the upper and lower ends of the ball for being pivotally supported.

Figure 2:
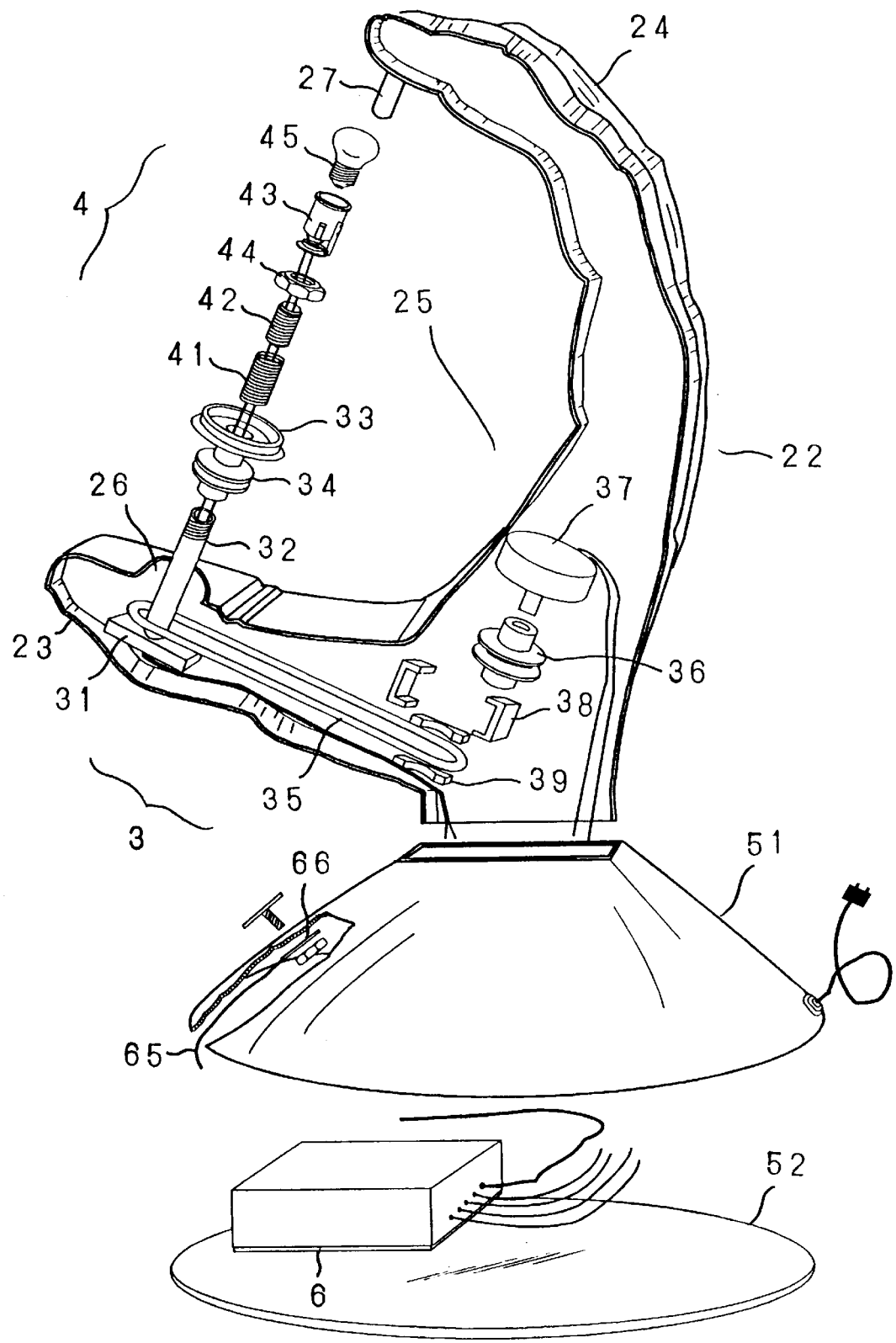
FIG. 2 is an exploded schematic view of the present invention.
Figure 3:
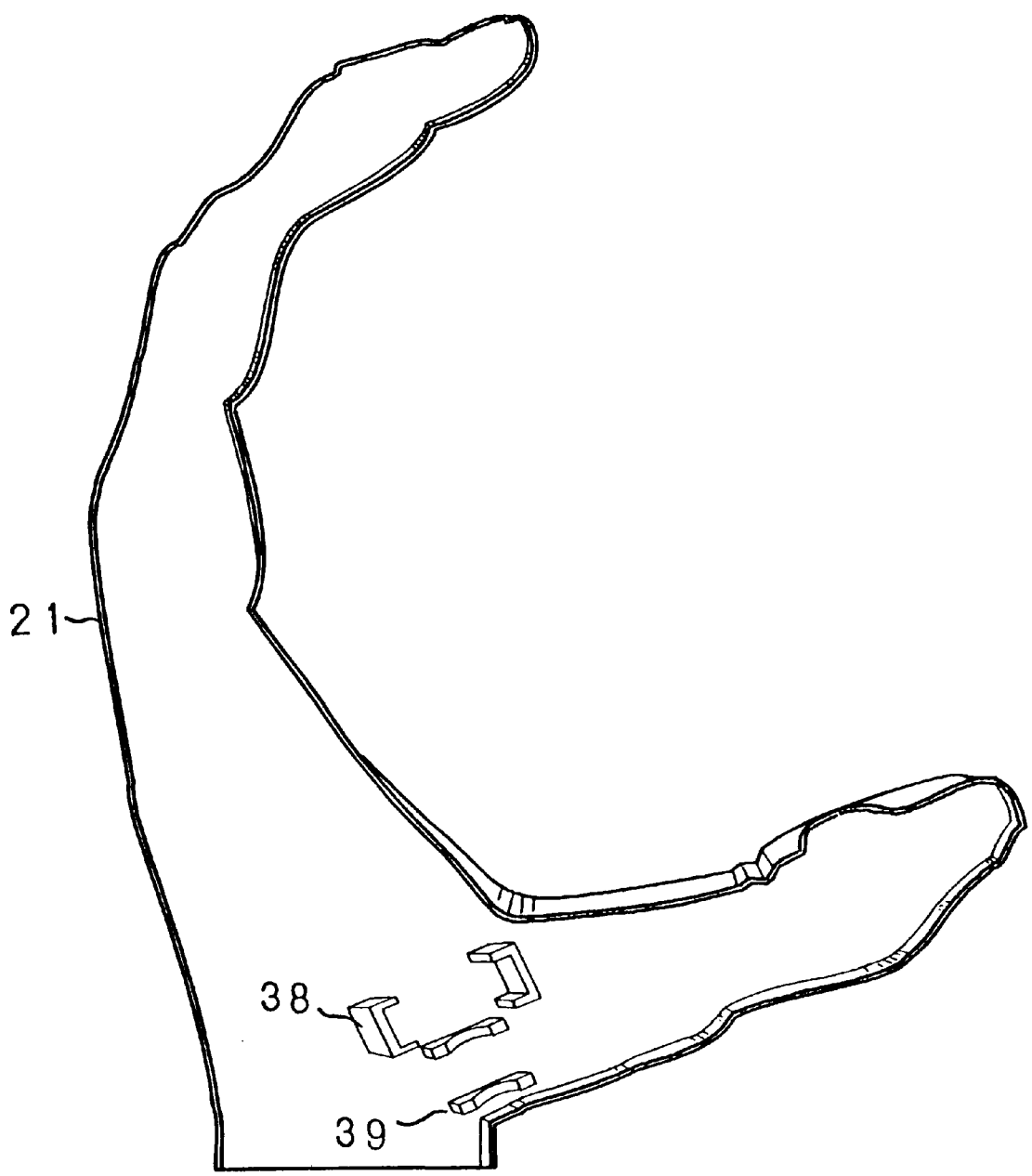
FIG. 3 is a schematic view of the front and rear mold plates of the palm shape supporting frame according to the present invention.
Figure 4:
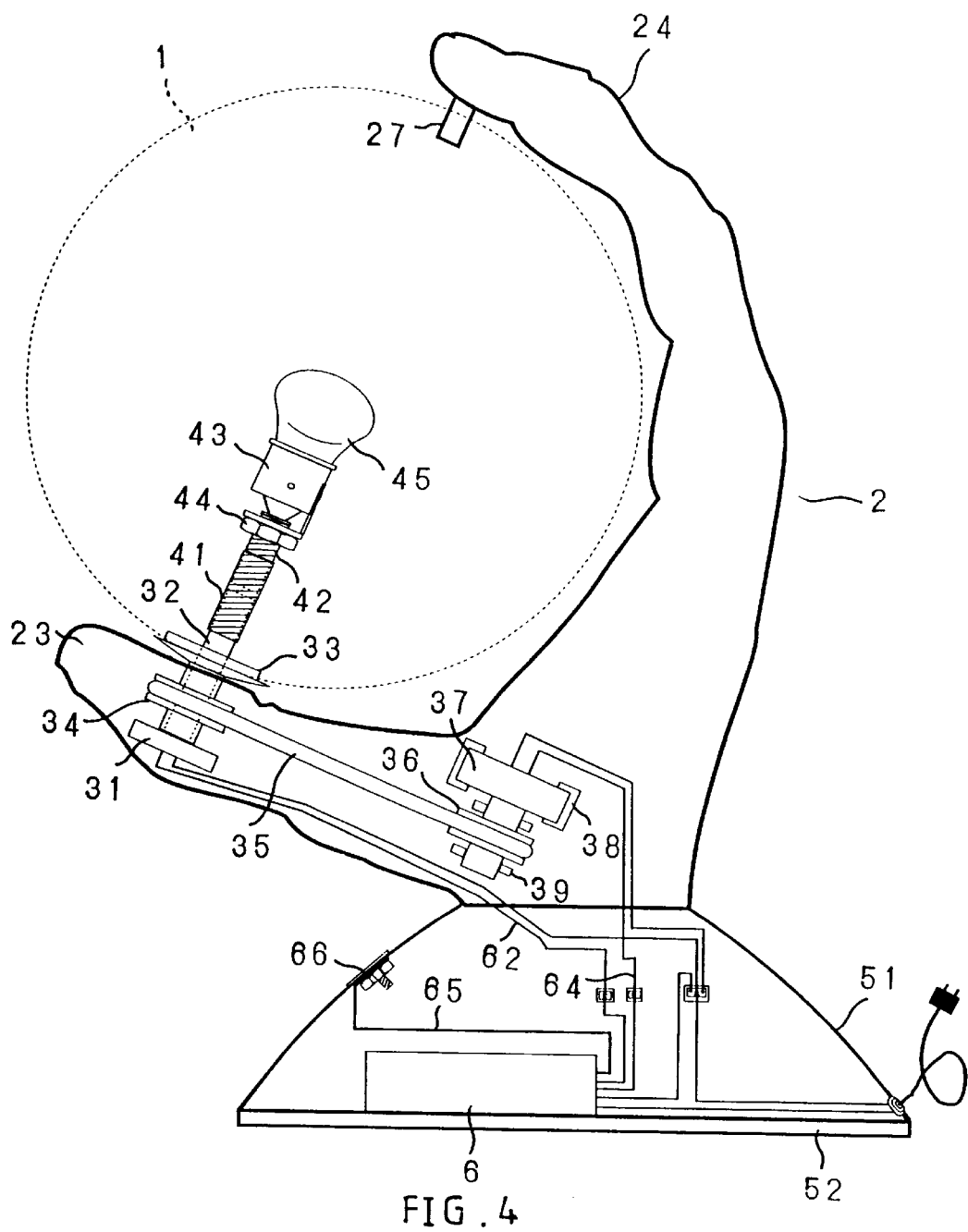
FIG. 4 is a schematic view of the dual loop touch controlled sensing circuit according to the present invention.

The palm-shape supporting frame (2) is formed by a front and a rear mold plates (21) and (22) with a shape correspondent to a palm (as shown in FIGS. 2 and 3). In assembled structure of the palm-shape supporting frame, the thumb portion (23) is transversally extended in the lower side of the ball (1). The other fingers (24) are located on lateral and upper side of the ball so as to form an opening section as a receiving space (25) the size of which is exactly sufficient to receive the ball (1). The distal end of the fingers (24), namely, the top end of the receiving space (25) is projected downwards with a pillar (27) which can be inserted into the hole on the upper end of the ball (1) for combining with the ball.

The ball driving device (3) includes a positioning piece (31), an axial rod (32), an under-pan (33) and two belt disk (34) and (36), a belt (35), a decelerated motor (37), two clamping pieces (38) and (39), etc. After the front and the rear mold plates (21) and (22) are assembled, the thumb portion (23) is formed with a hole (26) for being inserted by an axial rod (32) and a positioning piece (31) is firmly secured below the hole (26) for being installed with the axial rod (32). The axial rod can be engaged with the under-pan (33) and the belt disk (34). Where the under-pan (33) is firmly secured to the belt disk (34). In assembling, the elevation of the under-pan (33) is higher than that of the hole (26) so that the ball (1) can be located easily. Whereas the belt disk (34) is positioned within the thumb portion (23) of the palm-shape supporting frame (2) and a belt (35) can be engaged thereon. Another end of the belt (35) is connected to another belt disk (36). The belt disk (36) is pivotally installed below the central axis of the decelerated motor (37). The decelerated motor (37) and the belt disk (36) are clamped by two pairs of clamping pieces (38) and (39) on the respective front and rear mold plates (21) and (22). When the decelerated motor (37) is actuated, the belt disk (36) and the belt (35) serves to drive another belt disk (34) and the under-pan (33) so as to drive the ball (1) to rotate.

A light source (4) is installed above the under-pan (33). The components thereof includes a spring (41) one end of which is engaged to the top end of the axial rod (32), while another end thereof is screwed with a threaded tube (42) so that by the top end of the threaded tube (42), it can be installed with a bulb base (43). Finally, the light source (4) is fixed by a nut (44). The bulb base (43) serves to mount with a bulb (45) so as to emit light. In assembly, by the flexibility and elasticity of the spring (41), the light source can be penetrated through the ball (1) from the lower hole on the lower end of the ball.

Figure 5:
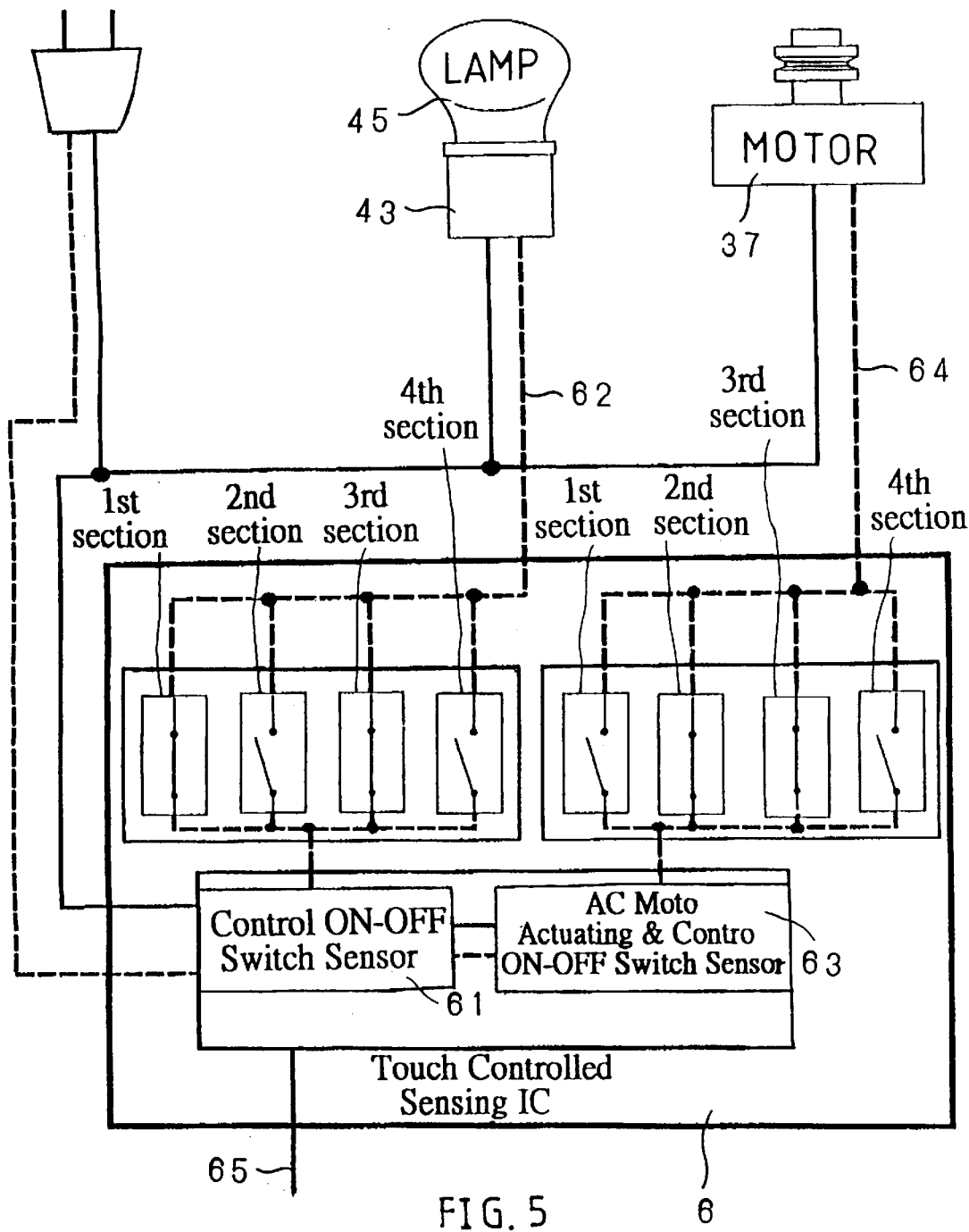
FIG. 5 is a schematic of the four stages control.

The seat (5) is formed by a conductive upper cover (51) and a conductive lower cover (52). The lower portion thereof is installed with a touch controlled sensing circuit system (6) including a switch sensor (61) for controlling the ON-OFF states of the bulb which can be connected to the bulb base (43) through a circuit (62), an AC motor actuator and switch sensor (63) for controlling the ON-OFF states of the decelerated motor (37). The AC motor actuator and switch sensor (63) are connected to the decelerated motor (37) through another circuit (64). A metal piece (66) is connected to the upper cover (51) through a touch controlled wire (65). When a finger touches the seat, the circuit will be conducted, then a four stage control of the light source (4) and the power switching of the decelerated motor (37) are performed sequentially. This is a dual loop touch controlled switch circuit. As shown in FIG. 5, the four stages control is described in the following:

A. Stage 1: When a finger touches the seat (5), the circuit (62) connected to the bulb (45) is conducted so that the bulb will light up, while the circuit (64) connected to the decelerated motor (37) is electrically isolated. If the decelerated motor has not been actuated, then the under-pan (33) will be motionless, namely, the ball (1) stands still.

B. Stage 2: When the finger touches the seat (5), the circuit (64) connected to the decelerated motor (37) is conducted so that the decelerated motor is actuated, then the under-pan (33) will rotate, namely, the ball (1) also rotates. While the circuit (62) connected to the bulb (45) is isolated. Then the bulb does not light up.

C. Stage 3: When the finger touches the seat (5), the circuits (64) and (62) of the decelerated motor (37) and the bulb (45) are conducted at the same time, then the bulb (45) lights up and the ball (1) rotates.

D. Stage 4: When the finger touch the seat (5), the circuit (64) and (62) of the decelerated motor (37) and the bulb (45) are isolated simultaneously, thus the bulb does not light up and the ball (1) stands still.

In summary, in the touch controlled multiple functional terrestrial globe of the present invention, a well designed palm shape supporting frame serves to support a ball, and the driven structure of the ball is installed within inner space of the palm shape supporting frame. Meanwhile, by the dual loop touch controlled switch circuit, the power of the bulb (45) and the decelerated motor (37) are be controlled easily. Therefore, the user only uses his (or her) finger to touch the seat, then a power source switching assembly of four stages can be generated, so that the motion of the ball and the illumination of the bulb may be presented simultaneously or sequentially.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A touch controlled multiple functional terrestrial globe comprising:

a ball being a transparent round ball with a hollow inner space, a world map being depicted on the surface of the ball;

a palm-shaped supporting frame formed by a front and a rear mold plates with a shape correspondent to a palm, in an assembled structure of the palm-shaped supporting frame, a thumb portion being transversally extended in a lower side of the ball, other fingers being located on lateral and upper sides of the ball so as to form an opening section as a receiving space the size of which is sufficient to receive the ball;

a ball driving device firmly secured to an axial rod through a positioning piece, the axial rod being engaged with an under-pan and a belt disk, the under-pan serving to locate the ball, while the belt disk being connected to another belt disk under a central shaft of a decelerated motor through a belt, therefore, by starting the decelerated motor, the ball is driven to rotate;

a light source engaged on the axial rod through a spring for being screwedly connected by a threaded tube, while a bulb base is mounted on the top of the threaded tube for being installed with a bulb to emit light;

a seat installed on a lower portion of the palm-shaped supporting frame and formed by a conductive upper cover and a conductive lower cover, a touch controlled sensing circuit system being installed therewithin and including a switch sensor for controlling the ON-OFF states of the bulb which can be connected to the bulb base through a circuit, and an AC motor actuator and switch sensor for control the ON-OFF of the decelerated motor, the AC motor actuator and the switch sensor being connected to the decelerated motor through another circuit, a metal piece being connected to the upper cover through a touch controlled wire, when a finger touches the seat, the circuit will be conducted, then a four stage control of the light source and a power switching of the decelerated motor being performed sequentially.

2. The touch controlled multiple functional terrestrial globe as claimed in claim 1, wherein the decelerated motor and the belt disk are clamped by two pairs of clamping pieces within the respective front and the rear mold plates.

* * * * *